United States Patent
Limbaugh et al.

(10) Patent No.: US 10,026,323 B2
(45) Date of Patent: Jul. 17, 2018

(54) UNMANNED AERIAL SYSTEM POSITION REPORTING SYSTEM

(71) Applicant: Kutta Technologies, Inc., Phoenix, AZ (US)

(72) Inventors: Douglas V. Limbaugh, Phoenix, AZ (US); David H. Barnhard, Lilburn, GA (US); Thomas H. Rychener, Phoenix, AZ (US)

(73) Assignee: Kutta Technologies, Inc., Phoenix, AZ (US)

( * ) Notice: Subject to any disclaimer, the term of this patent is extended or adjusted under 35 U.S.C. 154(b) by 17 days.

(21) Appl. No.: 15/436,155

(22) Filed: Feb. 17, 2017

(65) Prior Publication Data

US 2017/0162058 A1 Jun. 8, 2017

Related U.S. Application Data

(63) Continuation of application No. 14/819,119, filed on Aug. 5, 2015, now Pat. No. 9,595,198, which is a (Continued)

(51) Int. Cl.
*G01S 3/02* (2006.01)
*G08G 5/00* (2006.01)
(Continued)

(52) U.S. Cl.
CPC ......... *G08G 5/0013* (2013.01); *B64C 39/024* (2013.01); *G08G 5/0026* (2013.01);
(Continued)

(58) Field of Classification Search
USPC ......... 701/3, 2, 14, 408, 484, 485, 517, 120; 342/36, 463; 340/961
See application file for complete search history.

(56) References Cited

U.S. PATENT DOCUMENTS

| | | |
|---|---|---|
| 3,564,134 A | 2/1971 | Rue et al. |
| 5,111,400 A | 5/1992 | Yoder |

(Continued)

FOREIGN PATENT DOCUMENTS

EP    1884908 B1    6/2008

OTHER PUBLICATIONS

PCT International Search Report for related PCT/US2009/034088, dated Dec. 14, 2009, 3 pages.
(Continued)

*Primary Examiner* — Adam D Tissot
(74) *Attorney, Agent, or Firm* — Kirby Drake

(57) ABSTRACT

An unmanned aerial system (UAS) position reporting system may include an air traffic control reporting system (ATC-RS) coupled with a ground control station (GCS) of a UAS and at least one remote terminal. The ATC-RS may include an automatic dependent surveillance broadcast (ADS-B) and traffic information services broadcast (TIS-B) transceiver and one or more telecommunications modems. The ATC-RS may receive position data of at least one UAS in an airspace from the GCS and the at least one remote terminal and selectively communicate the position of the at least one UAS in the airspace to a civilian air traffic control center (ATC), to a military command and control (C2) communication center, or to both through the ADS-B and TIS-B transceiver. The ATC-RS may display the position of the at least one UAS in the airspace on a display screen coupled with the ATC-RS.

20 Claims, 3 Drawing Sheets

Related U.S. Application Data continuation-in-part of application No. 13/752,438, filed on Jan. 29, 2013, now Pat. No. 9,129,520, which is a continuation of application No. 12/370,407, filed on Feb. 12, 2009, now Pat. No. 8,386,175.

(60) Provisional application No. 61/029,094, filed on Feb. 15, 2008.

(51) Int. Cl.
  *H04J 3/00* (2006.01)
  *B64C 39/02* (2006.01)

(52) U.S. Cl.
  CPC ......... *G08G 5/0069* (2013.01); *G08G 5/0082* (2013.01); *H04J 3/00* (2013.01)

(56) References Cited

U.S. PATENT DOCUMENTS

| | | | |
|---|---|---|---|
| 5,574,648 A | 11/1996 | Pilley | |
| 5,716,032 A | 2/1998 | McIngvale | |
| 5,890,079 A | 3/1999 | Levine | |
| 6,147,980 A | 11/2000 | Yee et al. | |
| 6,173,159 B1 | 1/2001 | Wright et al. | |
| 6,176,451 B1 | 1/2001 | Drymon | |
| 6,338,011 B1 | 1/2002 | Furst et al. | |
| 6,677,888 B2 | 1/2004 | Roy | |
| 6,799,114 B2 | 9/2004 | Etnyre | |
| 6,806,829 B2 | 10/2004 | Smith et al. | |
| 6,857,601 B2 | 2/2005 | Akahori | |
| 6,908,061 B2 | 6/2005 | Akahori | |
| 6,995,688 B2 | 2/2006 | Reynolds | |
| 7,130,741 B2 | 10/2006 | Bodin et al. | |
| 7,228,232 B2 | 6/2007 | Bodin et al. | |
| 7,269,513 B2 | 9/2007 | Herwitz | |
| 7,782,256 B2 * | 8/2010 | Smith | G01S 5/06 342/453 |
| 2002/0075179 A1 | 6/2002 | Hudson et al. | |
| 2003/0114115 A1 | 6/2003 | Overy et al. | |
| 2004/0148067 A1 | 7/2004 | Griffith et al. | |
| 2004/0232285 A1 | 11/2004 | Akahori | |
| 2005/0200501 A1 | 9/2005 | Smith | |
| 2006/0032978 A1 | 2/2006 | Matos et al. | |
| 2006/0197700 A1 | 9/2006 | Stevens et al. | |
| 2006/0253254 A1 | 11/2006 | Herwitz | |
| 2007/0222665 A1 | 9/2007 | Koeneman | |
| 2007/0252760 A1 * | 11/2007 | Smith | G01S 5/0027 342/451 |
| 2008/0033604 A1 | 2/2008 | Margolin | |
| 2008/0055149 A1 * | 3/2008 | Rees | H01Q 1/28 342/29 |
| 2008/0158041 A1 | 7/2008 | Crudeli et al. | |
| 2008/0191942 A1 | 8/2008 | Smith et al. | |
| 2008/0201024 A1 | 8/2008 | Matos | |
| 2008/0215204 A1 | 9/2008 | Roy et al. | |
| 2008/0221745 A1 | 9/2008 | Diamandis et al. | |
| 2008/0243314 A1 | 10/2008 | Ridenour | |
| 2008/0255711 A1 | 10/2008 | Matos | |
| 2009/0012657 A1 | 1/2009 | Knotts et al. | |
| 2009/0222148 A1 | 9/2009 | Knotts et al. | |
| 2010/0224732 A1 | 9/2010 | Olson et al. | |
| 2011/0130913 A1 | 6/2011 | Duggan et al. | |

OTHER PUBLICATIONS

PCT International Preliminary Report on Patentability and Written Opinion of the International Search Authority for related PCT/US2009/034088, dated Aug. 17, 2010, 5 pages.

Hartford, Robin, UAT Puts UAVs on the Radar, www.mitre.org/news/digest/aviation/06 08/av uat.html, Jun. 2008, p. 1-3.

Strain, Robert, A Lightweight, Low-Cost ADS-B System for UAS Applications, Distribution Unlimited Case 07-0634, 207, p. 1-9.

Strain, Robert, Lightweight Beacon System for UAS and Other Aviation Applications, Mitre Corporation, 2007, p. 1-9.

* cited by examiner

UNMANNED AERIAL SYSTEM POSITION REPORTING SYSTEM

CROSS-REFERENCE TO RELATED APPLICATIONS

The present application is a continuation of U.S. patent application Ser. No. 14/819,119, filed Aug. 5, 2015, which is a continuation-in-part of U.S. patent application Ser. No. 13/752,438 filed Jan. 29, 2013 entitled "Unmanned Aerial System Position Reporting System", which is a continuation of U.S. patent application Ser. No. 12/370,407 filed Feb. 12, 2009 entitled "Unmanned Aerial System Position Reporting System," which claims the benefit of U.S. Provisional Patent Application 61/029,094 filed Feb. 15, 2008 entitled "Unmanned Aerial System Position Reporting Systems and Related Methods," all of which are hereby incorporated herein by reference for all purposes.

STATEMENT REGARDING FEDERALLY SPONSORED RESEARCH OR DEVELOPMENT

This invention was made with Government support under Contract FA8750-07-C-0096 awarded by the Air Force. The Government has certain rights in this invention.

BACKGROUND

1. Technical Field

Aspects of this document relate generally to control and position reporting systems for unmanned systems, such as aircraft and vehicles.

2. Background Art

Unmanned systems, particularly aircraft and ground vehicles, perform a wide variety of tasks, including mapping, reconnaissance, range finding, target location, combat, ordinance destruction, and sample collection. The use of ground or water-based unmanned vehicles conventionally involves a remote operator guiding the vehicle while manned vehicles detect the presence of the unmanned vehicle using position tracking systems and methods (visual, radar, sonar). Because of the speed and relatively small size of unmanned aerial systems (UASs) however, the use of visual and/or radar techniques to detect the presence of the UAS may make it difficult for pilots of manned aircraft to avoid a collision. To reduce the risk of collision, many conventional UASs are operated in "sterilized" airspace, which has been previously cleared of all manned air traffic by air traffic controllers.

SUMMARY

Implementations of unmanned aerial system (UAS) position reporting systems may include an air traffic control reporting system (ATC-RS) coupled with a ground control station (GCS) of an unmanned aerial system where the ATC-RS includes an automatic dependent surveillance broadcast (ADS-B) and a traffic information services broadcast (TIS-B) transceiver (or other similar messaging types) and one or more telecommunication modems. The ATC-RS may be adapted to receive position data of the UAS in an airspace from the GCS and communicate the position of the UAS in the airspace to a civilian air traffic control center (ATC) or to a military command and control (C2) communication center through an ADS-B signal or through a TIS-B signal through the ADS-B and TIS-B transceiver. The ATC-RS may also be adapted to communicate with a civilian ATC or with a military C2 communication center through voice and data using the one or more telecommunication modems. The ATC-RS may be adapted to display the position of the UAS in the airspace on one or more display screens coupled with the ATC-RS.

Implementations of UAS position reporting systems may include one, all, or any of the following:

The ATC-RS may be further adapted to communicate the position of the UAS in a Standardization Agreement (STANAG) 4586 signal; a Cursor on Target (CoT) formatted signal; an ADS-B signal, TIS-B signal or other similar message type; a Standard Terminal Arrival Routes (STARS) signal; or an All Purpose Structured Eurocontrol Surveillance Information Exchange (ASTERIX) signal.

The ATC-RS may further include a UAS position data collector included in the GCS of the UAS and adapted to receive position data for the UAS in the airspace from the GCS and a communications input/output (I/O) circuit adapted to receive position data of the UAS in the airspace through a universal serial bus (USB) port connection with the GCS and to route data and voice information within the ATC-RS, where the communications I/O circuit is coupled with the ADS-B and TIS-B transceiver and the one or more telecommunication modems. The ATC-RS may also include an air traffic control (ATC) communication formatting module coupled with the communications I/O circuit and adapted to receive the position data from the UAS position data collector and to produce a civilian position data stream by formatting the position data to correspond with a civilian ATC data format. A command and control (C2) communication formatting module may be included and coupled with the communications I/O circuit. The C2 communication formatting module may be adapted to receive the position data from the UAS position data collector and to produce a military position data stream by formatting the position data to correspond with a military C2 communication center data format. A voice link module may also be included and may be coupled with the communications I/O circuit and may be adapted to receive voice information from a microphone and to convert the voice information to a voice data signal.

The communications input/output (I/O) circuit may further include a USB hub, a Wide Area Augmentation System (WAAS) Global Positioning System (GPS) receiver, a Recommended Standard-232 (RS-232) and RS-422 to USB interface, one or more power converters, an embedded flash drive, and an external power supply.

The one or more telecommunication modems may be one or more satellite modems.

Other implementations of unmanned aerial system reporting systems may include an unmanned aerial system (UAS) ground control station (GCS) adapted to receive or generate data identifying the position of a UAS in an airspace and to allow an operator of the UAS to operate the UAS and an air traffic control reporting system (ATC-RS) coupled with the GCS and adapted to communicate the position of the UAS in the airspace to an air traffic control center (ATC) or to a military command and control (C2) communication center. The ATC-RS may include an automatic dependent surveillance broadcast (ADS-B) and traffic information services broadcast (TIS-B) transceiver adapted to transmit the position of the UAS in the airspace to the ATC as an ADS-B signal, a TIS-B signal or another similarly behaving message type. The ATC-RS may also include one or more telecommunication modems adapted to allow an operator of the UAS to communicate by voice with the ATC and one or more display screens coupled with the ATC-RS adapted to display the position of the UAS in the airspace.

In embodiments of the present disclosure, the ATC-RS may be tethered to other network-connected remote terminals in addition to a UAS main GCS. Other network-connected remote terminals may include, but are not limited to, a cell phone, a cell phone network, a computing device on a wired or wireless network, a radio, or other terminal that the UAS may use to transmit its data to the ground.

In embodiments of the present disclosure, a remote terminal other than a UAS main GCS may receive UAS location data via one or more data sources including, but not limited to, Motion Imagery Standards Board (MISB) Standard 0601.4 UAS Datalink Local Metadata Set, a wired or wireless connection to the UAS main GCS, and remote UAS monitoring/control using UAS industry standard messaging formats. Each of these data sources is discussed in more detail below.

Motion Imagery Standards Board (MISB) Standard 0601.4 UAS Datalink Local Metadata Set provides for the packaging of UAS location data as a key-length-value (KLV) private data stream along with a video data stream within an MPEG-2 Transport Stream broadcast from the UAS. The KLV metadata embedded in the MPEG-2 transport stream can be decoded and given to the ATC-RS system to transmit ADS-B/TIS-B real-time position updates.

Use of a wired or wireless connection to the UAS main GCS may allow the ATC-RS ADS-B radio to be located away from the GCS either to provide extended range or for other operational purposes. In such an embodiment, a remote terminal may be connected to the GCS over a network (wired or wireless) that may transmit raw UAS position data to the remote terminal. Having an ATC-RS according to embodiments of the present disclosure tethered to the remote terminal may allow for transmission of ADS-B/TIS-B or other related message formats for real-time position updates from the remote terminal location.

With remote UAS monitoring/control using UAS industry standard messaging formats (STANAG 4586, Cursor on Target, etc.), a remote terminal may be given limited monitoring/control of a UAS. In these instances, an ATC-RS according to embodiments of the present disclosure may be tethered to the remote terminal, and the remote terminal may provide the raw UAS positional data similar to the case when the ATC-RS is tethered to the UAS main GCS.

Implementations of a UAS position reporting system may include one, all, or any of the following:

The ATC-RS may further include a UAS position data collector included in the GCS of the UAS and adapted to receive position data for the UAS in the airspace from the GCS. A communications input/output (I/O) circuit may be included and may be adapted to receive position data of the UAS in the airspace through a universal serial bus (USB) port connection with the GCS and the route data and voice information within the ATC-RS and may be coupled with the ADS-B and TIS-B transceiver and the one or more telecommunication modems. An air traffic control (ATC) communication formatting module may be included and may be coupled with the communications I/O circuit and adapted to receive the position data from the UAS position data collector and to produce a civilian position data stream by formatting the position data to correspond with a civilian ATC data format. A command and control (C2) communication formatting module may be included and may be coupled with the communications I/O circuit and may be adapted to receive the position data from the UAS position data collector and to produce a military position data stream by formatting the position data to correspond with a military C2 communication center data format. A voice link module may also be included that is coupled with the communications I/O circuit and adapted to receive voice information from a microphone and to convert the voice information to a voice data signal.

The communications I/O circuit may further include a USB hub, a Wide Area Augmentation System (WAAS) Global Positioning System (GPS) receiver, a Recommended Standard-232 (RS-232) and RS-422 to USB interface, one or more power converters, an embedded flash drive, and an external power supply.

The ATC-RS may be further adapted to communicate the position of the UAS in a Standardization Agreement (STANAG) 4586; a Cursor on Target (CoT) formatted signal; an ADS-B or TIS-B signal; a Standard Terminal Arrival Routes (STARS) signal, or an All Purpose Structured Eurocontrol Surveillance Information Exchange (ASTERIX) formatted signal.

The one or more telecommunication modems may be one or more satellite modems.

Implementations of an air traffic control reporting system (ATC-RS) may include an unmanned aerial system (UAS) position data collector adapted to receive position data for the UAS in an airspace from a GCS and a communications input/output (I/O) circuit adapted to receive position data of the UAS in the airspace through a universal serial bus (USB) port connection with the GCS and to route data and voice information within the ATC-RS. An air traffic control (ATC) communication formatting module may be included and may be coupled with the communications I/O circuit and adapted to receive the position data from the UAS position data collector and to produce a civilian position data stream by formatting the position data to correspond with a civilian ATC data format. A command and control (C2) communication formatting module may be included and may be coupled with the communications I/O circuit and may be adapted to receive the position data from the UAS position data collector and to produce a military position data stream by formatting the position data to correspond with a military C2 communication center data format. A voice link module may be included and may be coupled with the communications I/O circuit and may be adapted to receive voice information from a microphone and to convert the voice information to a voice data signal. One or more satellite modems may be coupled with the communications I/O circuit and may be adapted to transmit the voice data signal through a voice communication network and to transmit one or more data signals to a civilian ATC or to a military C2 communication center. An automatic dependent surveillance broadcast (ADS-B) and traffic information services broadcast (TIS-B) transceiver may be included and may be coupled with the communications I/O circuit and may be adapted to receive the civilian position data stream and the military position data stream and to transmit an ADS-B signal or a TIS-B signal, or another similarly behaving message type, corresponding with the civilian position data stream or the military position data stream.

Implementations of an ATC-RS may include one, all, or any of the following:

The military C2 communication center data format may be in standardization Agreement (STANAG) 4586; Cursor on Target (CoT); Standard Terminal Arrival Routes (STARS); or an All Purpose Structured Eurocontrol Surveillance Information Exchange (ASTERIX) format.

The communications I/O circuit may further include a USB hub, a Wide Area Augmentation System (WAAS) Global Positioning System (GPS) receiver, a Recommended Standard-232 (RS-232) and RS-422 to USB interface, one or more power converters, an embedded flash drive, and an external power supply.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations all hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended unmanned aerial system (UAS) position reporting system and/or assembly procedures for a UAS position reporting system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such UAS position reporting systems and implementing components, consistent with the intended operation.

Figure 1:
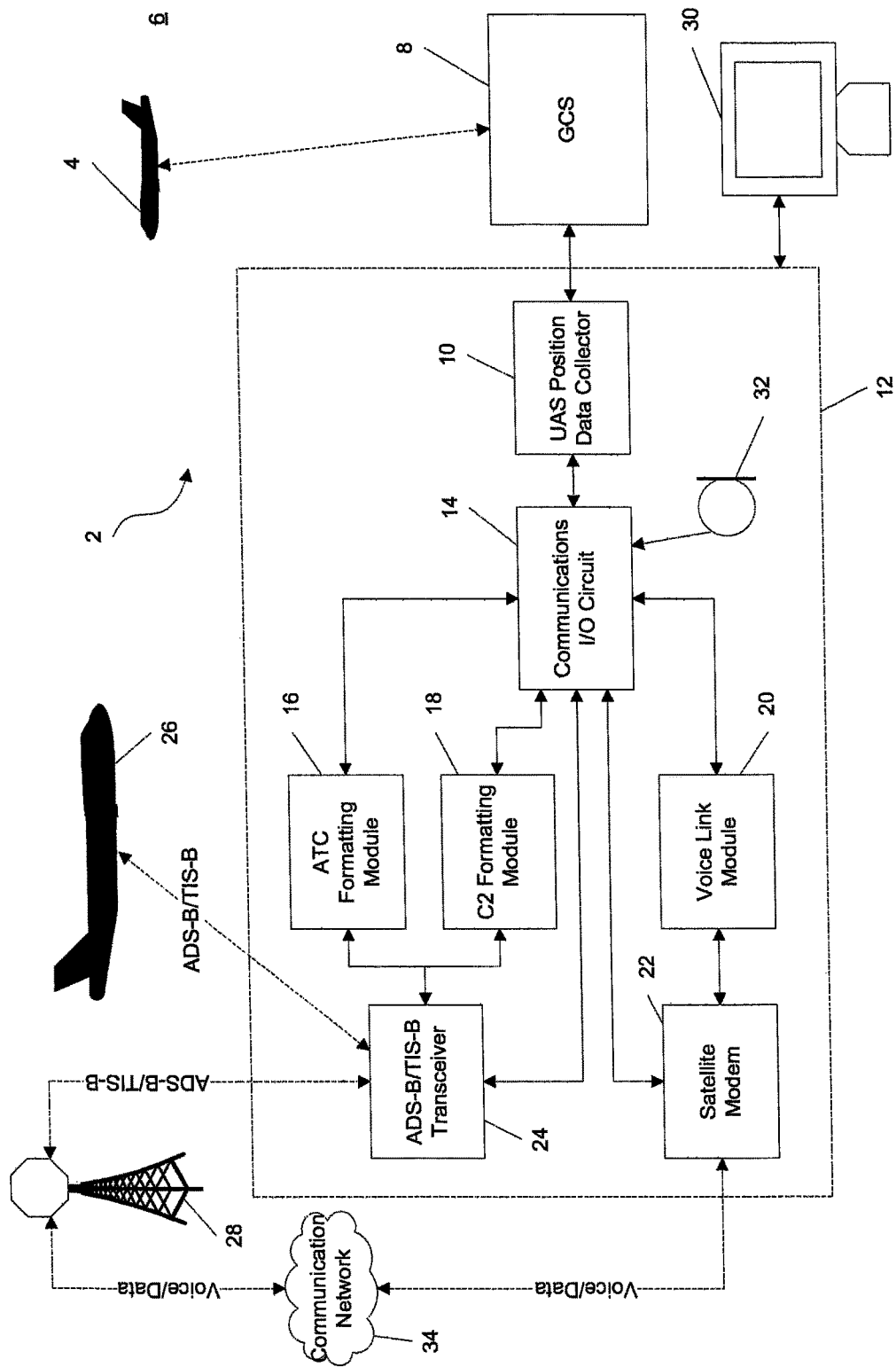
FIG. 1 is a flow chart of an implementation of an unmanned aerial system (UAS) position reporting system.

Referring to FIG. 1, a flow chart of an implementation of a UAS position reporting system 2 is illustrated. As illustrated, a UAS 4 may be airborne in a particular airspace 6 and being guided in flight by an operator through a ground control station (GCS) 8, which is coupled to UAS position data collector 10. A UAS also may communicate with one or more remote terminals as described herein and depicted, for example, in FIG. 1. In particular implementations, the UAS position data collector 10 may be a separate unit from the GCS 8; in other implementations, the UAS position data collector 10 may be incorporated into or exist in computer readable form on computer readable media and be operated by the GCS as a software program. The UAS position data collector 10 gathers position data that the GCS 8 is receiving from the UAS 4 or generating while the UAS 4 moves within the airspace 6. The UAS position data collector 10 then acts as a source of the position data for the rest of the UAS position reporting system 2.

As illustrated, the UAS position data collector 10 is included in an air traffic control reporting system (ATC-RS) 12. In particular implementations of UAS position reporting systems 2, the UAS position data collector 10 may be physically included in the ATC-RS 12; in other implementations, the UAS position data collector 10 may be physically separated from the ATC-RS 12.

As illustrated, the ATC-RS 12 also includes a communications input/output (I/O) circuit 14 coupled with an air traffic control (ATC) formatting module 16, a command and control (C2) formatting module 18, a voice link module 20, one or more telecommunication modems 22, an automatic dependent surveillance broadcast (ADS-B) and a traffic information services broadcast (TIS-B) transceiver 24, and a microphone 32. The communications I/O circuit 14 may serve in particular implementations to route signals and or power between all of the various modules and components; in other implementations, it may route signals between only some of the modules and an additional communications router module may be utilized for routing.

The communications I/O circuit 14 receives position data from the UAS position data collector 10 and routes it to the ATC formatting module 16 and the C2 formatting module 18. Whether the ATC formatting module 16 or the C2 formatting module 18, or both, are utilized during operation of the UAS position reporting system 2 depends upon whether the system will interface with a civilian air traffic control or military air traffic control system or both. If the system will operate in a civilian system, the ATC formatting module 16 formats the position data into a civilian data stream in a civilian data format. Examples of civilian data formats include but are not limited to ADS-B, TIS-B, Standard Terminal Arrival Routes (STARS), and All Purpose Structured Eurocontrol Surveillance Information Exchange (ASTERIX). If the UAS position reporting system 2 is being utilized in a military environment, the C2 formatting module 18 will format the position data into a military data stream in a military data format. Examples of military data formats include, by non-limiting example, Standardization Agreement (STANAG) 4586, Cursor on Target (CoT), and any other military air traffic control data format. Various forms of operating mode selection may be included in implementations of UAS position reporting systems 2 to permit operation in civilian, military, or in both civilian and military mode. In all data formats and in all system implementations disclosed in this document, any of a wide variety of radio transceiver types may be utilized. For example, in military applications, specialized radio transceiver types other than ADS-B and TIS-B transceivers may be utilized; in civilian applications, certain format types may also require the use of a different radio type than an ADS-Band TIS-B transceiver. The use of ADS-B and TIS-B transceivers in implementations in this document is for the exemplary purposes of this disclosure.

The formatted data streams then pass to the ADS-Band TIS-B transceiver 24 for broadcasting as either an ADS-B signal or a TIS-B signal. In particular implementations, the TIS-B signal may be created by flipping a single bit in an ADS-B signal to indicate that the signal is coming from the ground. Relevant teachings regarding the nature and use of ADS-B and TIS-B transceivers and radios may be found in the provisional patent application to Limbaugh, et al., entitled "Unmanned Aerial System Position Reporting Systems and Related Methods," filed Feb. 15, 2008, the disclosure of which was previously incorporated herein by reference.

In some embodiments of the present disclosure, the ATC-RS may provide real-time position updates over ADS-B/TIS-B and/or to ATC for more than one UAS from a single ATC-RS using time-division multiplexing (TDM) technology. TDM is a method of transmitting and receiving independent signals over a common signal path by means of synchronized switches at each end of the transmission line so that each signal appears on the transmission line only a fraction of time in an alternating pattern. To utilize TDM, location data for more than one UAS may be networked to a single ATC-RS terminal according to embodiments of the present disclosure. The single ATC-RS terminal may determine when the data for each UAS is transmitted over ADS-B/TIS-B and/or to ATC. The number of UAS that may be handled by a single ATC-RS terminal according to embodiments of the present disclosure may depend on factors including, but not limited to, the required updated rates of the location data as well as the communication bandwidths of the networks involved. This may be useful in a search and rescue scenario where more than one small UAS may be cooperatively searching in a localized area, and the more than one small UAS may be operated from a single location. The close proximity of the GCS for each UAS relative to one another may make it possible to tether several UAS GCS to a single ATC-RS according to embodiments of the present disclosure. The single ATC-RS according to embodiments of the present disclosure may provide real-time location updates to ATC and/or over ADS-B/TIS-B for the more than one small UAS that may be involved in the search and rescue scenario.

Because the ADS-B radio system has been designated by the Federal Aviation Administration (FAA) as a component of the next generation air traffic control system, present and future aircraft will contain an ADS-B device capable of receiving signals from the ADS-B and TIS-B transceiver 24. Because of this, and as illustrated in FIG. 1, the UAS position reporting system 2 has the ability to directly inform such aircraft 26 of the position of the UAS 4. In particular implementations, as illustrated in FIG. 1, the ADS-B and TIS-B transceiver 24 has the ability to transmit ADS-B/TIS-B signals to an air traffic control center (ATC) or C2 control center 28, thus permitting air traffic control personnel at the center to be able to view the position of the UAS 4. Because the position of the UAS 4 is now known by neighboring aircraft 26 and may also be visible to personnel at the ATC or C2 control center 28, the risk of collision with the UAS 4 may be reduced. In addition, because the ADS-B and TIS-B transceiver 24 has the ability to receive ADS-B and TIS-B signals, an operator of the UAS 4 may also be able to view the position of neighboring aircraft 26 in relation to the position of the UAS 4 itself on one or more displays 30 coupled to the ATC-RS 12.

While the position of the UAS 4 may be made visible to personnel at the ATC 28 itself through the ATC-RS 12, because the personnel at the ATC 28 cannot maintain direct voice contact with the operator of the UAS 4, flight regulations may still not permit the UAS 4 to be flown in the vicinity of neighboring aircraft 26. In particular implementations of UAS position reporting systems 2, a voice link module 20 may be included that receives voice information from a microphone 32 coupled with the communications I/O circuit 14. The voice link module 20 formats the voice information into a voice data signal that is then broadcast using one or more telecommunication modems 22, which may be satellite modems in particular implementations. Because the one or more telecommunication modems 22 can be connected to the ATC 28 through a communication network 34, personnel at the ATC 28 can maintain voice contact with the operator of the UAS 4 while it is in flight and issue commands and request status updates. Examples of communications networks 34 that could be utilized for voice communication include the public switched telephone network (PSTN), the internet, a wide area network (WAN), a satellite communication network, or any other network capable of transmitting voice and data information. In particular implementations, additional or duplicate position data for the UAS 4 may be transmitted using the one or more telecommunication modems 22 to the ATC 28 in any desired data format, thereby providing both voice and data transmission capability as well as permitting the ATC 28 to utilize the position data for a wide variety of purposes, including displaying the position of the UAS 4.

Any of a wide variety of particular component types may be used to form particular implementations of UAS position reporting systems 2. For the exemplary purposes of this disclosure, the ATC formatting module 16 and C2 formatting module 18 may be implemented as computer readable instructions on computer readable media operable by a processor or an embedded controller. The voice link module 20 may be a transducer and the one or more telecommunication modems 22 may be an Iridium® 9522A satellite modem. The ADS-B/TIS-B transceiver may be a Universal Access Transceiver Beacon Radio (UBR) designed by MITRE Corporation of McLean, Va., USA.

Figure 2:
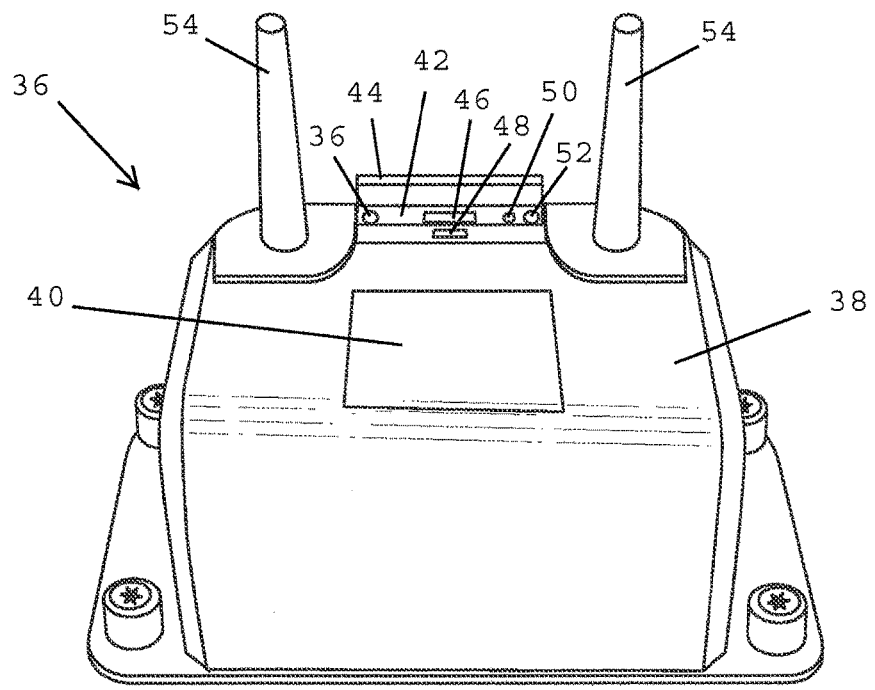
FIG. 2 is a front perspective view of an implementation of an air traffic control reporting system (ATC-RS)

Referring to FIG. 2, a particular implementation of an ATC-RS 36 is illustrated. As illustrated, the ATC-RS 36 may include a case 38 that houses and protects the various modules and components. The case 38 may be constructed to comply with a wide variety of military or other reliability standard specifications, such as, by non-limiting example, shock, vibration, impact, humidity, temperature, water resistance, or any other reliability or performance characteristic. The case 38 may include an opening for the one or more satellite modem antennas 40 and an interface opening 42 capable of being closed with lid 44 that contains various controls and interface types. As illustrated in FIG. 2, a universal serial bus (USB) port 46 may be included that is used to connect with a GCS unit. In particular implementations, the design of the communication I/O circuit allows connection of the ATC-RS 36 to the GCS using only one USB cable at the USB port 46. A main power switch 48, various indicator lights 50, and a microphone/headset interface 52 may also be included. As illustrated, one or more ADS-B and TIS-B transceiver antennas 54 may extend from the case 38. A wide variety of other components, such as external power supplies, internal power supplies, batteries, displays, or other components may be included within or external to the case as part of the ATC-RS 36.

Figure 3:
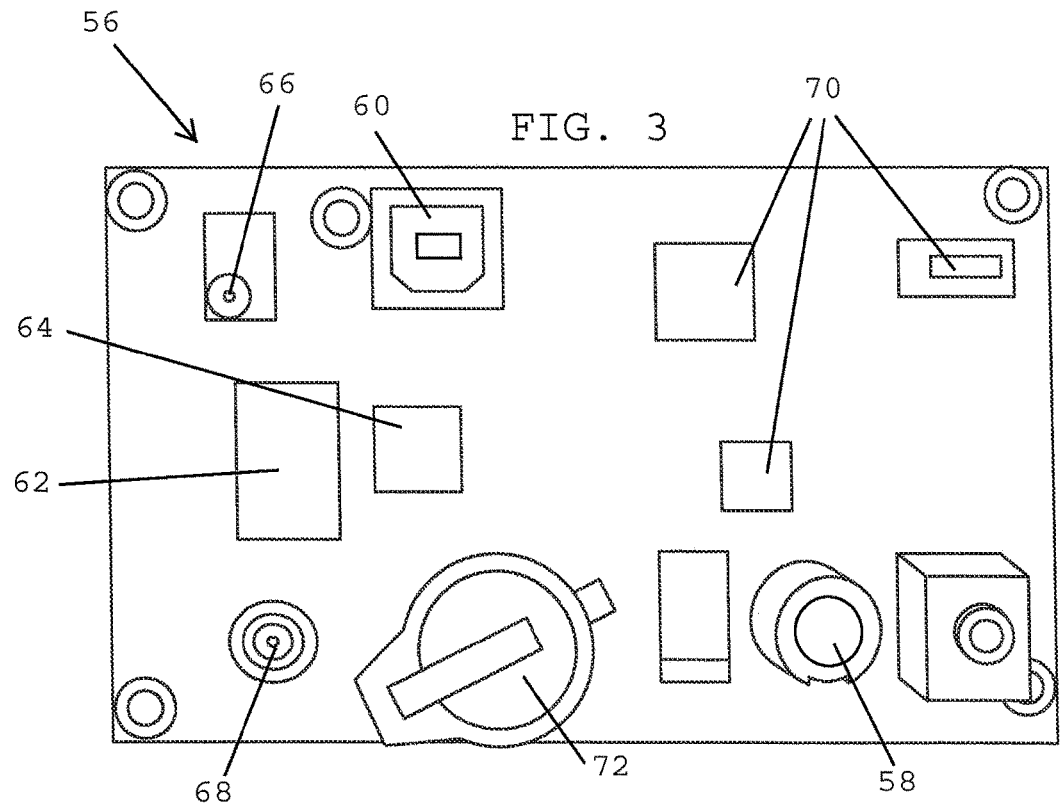
FIG. 3 is a top block view of an implementation of a communications input/output (I/O) circuit.

Referring to FIG. 3, an implementation of a communication I/O circuit 56 is illustrated. As illustrated, the circuit 56 may include a Recommended Standard (RS) 232 and RS-422 to Universal Serial Bus (USB) converter, accessible via RS-232/RS-422 connector 58 on the board. In particular implementations, an RS-485 serial connector interface or RS-432 interface may also be included or may be used in place of either the RS-232 or RS-422 portions. A USB port 60 and/or hub may be included as part of the circuit 56. A flash drive 62 may also be included as part of the circuit 56 and may be adapted in particular implementations to store flight position and/or other performance or operating data from the UAS during flight to act as a UAS "black box," particularly during UAS test flight situations. A flash memory controller 64 may be included as part of the circuit 56 along with power input 66, which is adapted to receive power from an external power supply. A Global Positioning System (GPS) receiver and antenna may be included as part of the circuit 56 and may be connected via a Bayonet Neill Concelman (BNC) connector or a Subminiature Version A (SMA) connector 68. As illustrated in FIG. 3, various other components 70 necessary to allow the circuit to route signals and power through the circuit and one or more internal batteries 72 for any processor clocks may also be included in particular implementations.

Figure 4:
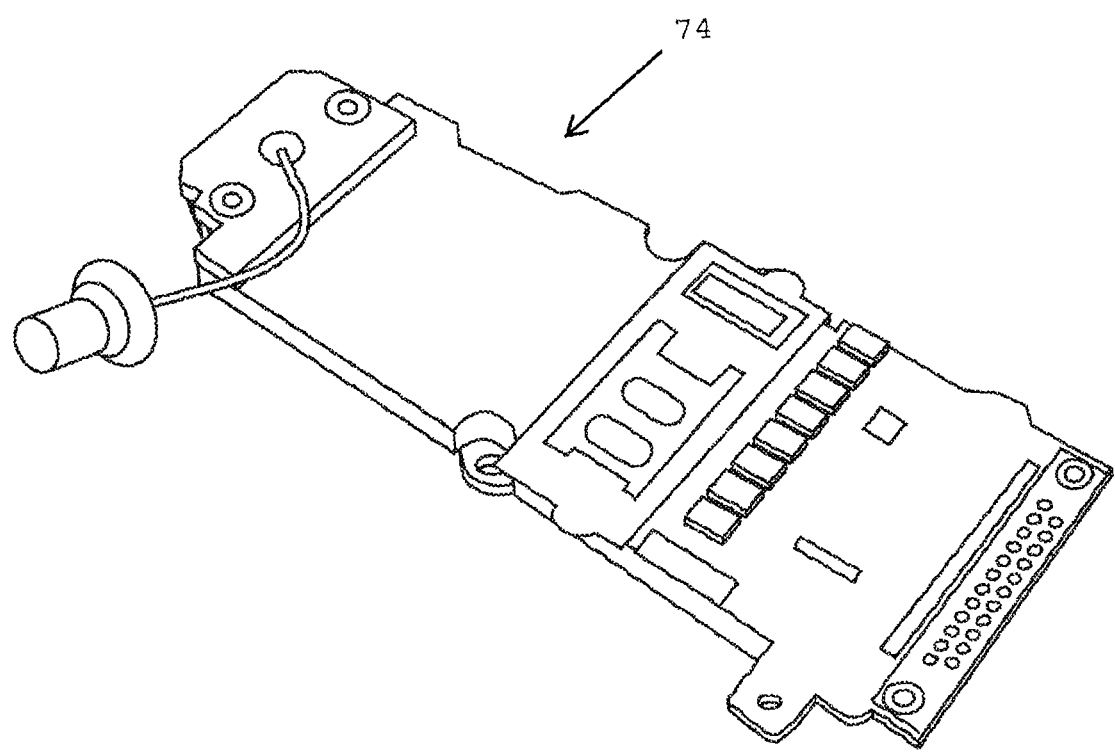
FIG. 4 is a front perspective view of an implementation of a satellite modem.

Referring to FIG. 4, an implementation of a satellite modem 74 is illustrated. The particular implementation illustrated in FIG. 4 is a partly disassembled Iridium® 9255A satellite modem. Because the Iridium® satellite network does not support voice and data communication on a single channel, implementations of UAS position reporting systems that utilize Iridium® branded modems require two satellite modems, one for voice, and one for data. However, any of a wide variety of other satellite modems, telecommunication modems, cellular networks, wireless devices, the internet, or other network devices could also be utilized for voice and/or data transmission in particular implementations.

The foregoing description has described implementations of ATC-RS units 12, 36 that are adapted to communicate with a UAS and with an ATC or C2 control center. The principles disclosed in this document, however, may be applied to any remotely, semi-autonomously, or autonomously guided land, surface water, submersible, or space vehicle where direct position communication with neighboring manned vehicles and/or an overseeing control center is desired.

When the term ATC is used, it should be appreciated that any other entity to where UAS positional data may be directed may be substituted without departing from the present disclosure. For example, the UAS location data may be networked, may be transmitted over cellular or data networks, and may be directly transmitted or transmitted over PSTN, to local law enforcement agencies or commercial entities interested in tracking their own assets instead of to ATC in some embodiments of the present disclosure.

It also be appreciated that where the terms ground control station, UAS main GCS, and/or GCS are used, a remote terminal as described herein may also fall within the scope of embodiments of the present disclosure.

In places where the description above refers to particular implementations of UAS position reporting systems, it should be readily apparent that a number of modifications may be made without departing from the spirit thereof and that these implementations may be applied to other UAS position reporting systems.

The invention claimed is:

1. An unmanned aerial system position reporting system comprising:
an air traffic control reporting system (ATC-RS) coupled with a ground control station (GCS) and at least one remote terminal, the GCS and the at least one remote terminal in operational communication with at least one unmanned aerial system (UAS) for guidance during flight, the ATC-RS adapted to:
gather from the GCS and the at least one remote terminal position data of the at least one UAS in an airspace, wherein the GCS and the at least one remote terminal receive the position data from the at least one UAS or the GCS and the at least one remote terminal generate the position data while the at least one UAS moves in the airspace;
selectively communicate the position of the at least one UAS in the airspace to a civilian air traffic control center (ATC), to a military command and control (C2) communication center, or to both a civilian ATC and a military C2 communication center through transmission via automatic dependent surveillance broadcast (ADS-B)/traffic information services broadcast (TIS-B) or a related message format; and
display the position of the at least one UAS in the airspace on one or more display screens coupled with the ATC-RS.

2. The system of claim 1, wherein the ATC-RS is further adapted to communicate the position of the at least one UAS in a Standardization Agreement (STANAG) 4586 signal; a Cursor on Target (CoT) formatted signal; an ADS-B signal, TIS-B signal or signal in a related message format; a Standard Terminal Arrival Routes (STARS) signal, or an All Purpose Structured Eurocontrol Surveillance Information Exchange (ASTERIX) signal.

3. The system of claim 1, wherein:
the ATC-RS further comprises one or more telecommunication modems; and
the ATC-RS is further adapted to communicate with the civilian ATC, with the military C2 communication center, or with both the civilian ATC and the military C2 communication center through voice and data using the one or more telecommunication modems.

4. The system of claim 3, wherein the ATC-RS further comprises:
a UAS position data collector adapted to receive position data for the at least one UAS in the airspace from the GCS and the at least one remote terminal;
a communications input/output (I/O) circuit adapted to receive position data of the at least one UAS in the airspace through a universal serial bus (USB) port connection with the GCS and the at least one remote terminal and to route data and voice information within the ATC-RS, the communications I/O circuit coupled with an ADS-B and TIS-B (or related message format) transceiver and the one or more telecommunication modems;
an air traffic control (ATC) communication formatting module coupled with the communications I/O circuit, the ATC communication formatting module adapted to receive the position data from the UAS position data collector and to produce a civilian position data stream by formatting the position data to correspond with a civilian ATC data format; and
a command and control (C2) communication formatting module coupled with the communications I/O circuit, wherein the C2 communication formatting module is adapted to receive the position data from the UAS position data collector and to produce a military position data stream by formatting the position data to correspond with a military C2 communication center data format.

5. The system of claim 1 wherein the at least one remote terminal is selected from the group comprising:
a cell phone, a cell phone network, a computing device on a wired network, a computing device on a wireless network, and a radio.

6. The system of claim 1 wherein the position data received by the at least one remote terminal is received from one or more data sources selected from the group comprising:
Motion Imagery Standards Board (MISB) Standard 0601.4 UAS Datalink Local Metadata Set, a wired or wireless connection to the GCS, and remote UAS monitoring/control using UAS industry standard messaging formats.

7. The system of claim 1 wherein the ATC-RS provides real-time position updates for the at least one UAS using time-division multiplexing (TDM).

8. An unmanned aerial system position reporting system comprising:
an unmanned aerial system (UAS) ground control station (GCS) and at least one remote terminal, the GCS and the at least one remote terminal adapted to receive or generate data identifying the position of at least one UAS in an airspace and to allow an operator of the at least one UAS to operate the at least one UAS;

an air traffic control reporting system (ATC-RS) coupled with the GCS and the at least one remote terminal, the ATC-RS adapted to gather from the GCS and the at least one remote terminal the data identifying the position of the at least one UAS and then selectively transmit the position of the at least one UAS in the airspace to an air traffic control center (ATC), or to a military command and control (C2) communication center, or to both an ATC and a military C2 communication center, the ATC-RS comprising:

an automatic dependent surveillance broadcast (ADS-B) and traffic information services broadcast (TIS-B) transceiver adapted to transmit the position of the at least one UAS in the airspace as an ADS-B signal, a TIS-B signal or a signal in another related message format; and one or more display screens coupled with the ATC-RS, the one or more display screens adapted to display the position of the at least one UAS in the airspace.

9. The system of claim 8 wherein the at least one remote terminal is selected from the group comprising:
a cell phone, a cell phone network, a computing device on a wired network, a computing device on a wireless network, and a radio.

10. The system of claim 8 wherein the data received by the at least one remote terminal is received from one or more data sources selected from the group comprising:
Motion Imagery Standards Board (MISB) Standard 0601.4 UAS Datalink Local Metadata Set, a wired or wireless connection to the GCS, and remote UAS monitoring/control using UAS industry standard messaging formats.

11. The system of claim 8 wherein the ATC-RS provides real-time position updates for the at least one UAS using time-division multiplexing (TDM).

12. The system of claim 8, wherein the ATC-RS is further adapted to communicate the position of the at least one UAS in a Standardization Agreement (STANAG) 4586 formatted signal; a Cursor on Target (CoT) formatted signal; an ADS-B signal, TIS-B signal or a signal in a related message format; a Standard Terminal Arrival Routes (STARS) formatted signal, or an All Purpose Structured Eurocontrol Surveillance Information Exchange (ASTERIX) formatted signal.

13. The system of claim 10, wherein the ATC-RS further comprises:
a UAS position data collector adapted to receive position data for the at least one UAS in the airspace from the GCS;
a communications input/output (I/O) circuit adapted to receive the position data of the at least one UAS in the airspace through a universal serial bus (USB) port connection with the GCS and to route data and voice information within the ATC-RS, the communications I/O circuit coupled with the ADS-B and TIS-B transceiver and the one or more telecommunication modems;
an air traffic control (ATC) communication formatting module coupled with the communications I/O circuit, the ATC communication formatting module adapted to receive the position data from the UAS position data collector and to produce a civilian position data stream by formatting the position data to correspond with a civilian ATC data format; and a command and control (C2) communication formatting module coupled with the communications I/O circuit, the C2 communication formatting module adapted to receive the position data from the UAS position data collector and to produce a military position data stream by formatting the position data to correspond with a military C2 communication center data format.

14. The system of claim 12, wherein the ATC-RS further comprises:
a voice link module coupled with the communications I/O circuit and adapted to receive voice information from a microphone and to convert the voice information to a voice data signal.

15. An air traffic control reporting system (ATC-RS) on the ground, the ATC-RS comprising:
an unmanned aerial system (UAS) position data collector, the UAS position data collector adapted to gather from a ground control station (GCS) and at least one remote terminal position data for at least one UAS in an airspace, the GCS and the at least one remote terminal in operational communication with the at least one UAS for guidance during flight;
a communications input/output (I/O) circuit adapted to receive position data from the GCS of the at least one UAS and the at least one remote terminal in the airspace through a universal serial bus (USB) port connection with the GCS and the at least one remote terminal and to route data and voice information within the ATC-RS;
an air traffic control (ATC) communication formatting module coupled with the communications I/O circuit, the ATC communication formatting module adapted to receive the position data from the UAS position data collector and to produce a civilian position data stream by formatting the position data to correspond with a civilian ATC data format;
a command and control (C2) communication formatting module coupled with the communications I/O circuit, the C2 communication formatting module adapted to receive the position data from the UAS position data collector and to produce a military position data stream by formatting the position data to correspond with a military C2 communication center data format; and
an automatic dependent surveillance broadcast (ADS-B) and traffic information services broadcast (TIS-B) transceiver coupled with the communications I/O circuit, the ADS-B transceiver adapted to receive the civilian position data stream and the military position data stream and to selectively transmit an ADS-B signal, a TIS-B signal or a signal in a related message format corresponding with the civilian position data stream, the military position data stream, or both the civilian position data stream and the military position data stream.

16. The system of claim 15, wherein the communications I/O circuit further comprises a USB hub, a Wide Area Augmentation System (WAAS) Global Positioning System (GPS) receiver, a Recommended Standard-232 (RS-232) and RS-422 to USB interface, one or more power converters, an embedded flash drive, and an external power supply.

17. The system of claim 15, the ATC-RS further comprising:
a voice link module coupled with the communications I/O circuit and adapted to receive voice information from a microphone and to convert the voice information to a voice data signal.

18. The system of claim 15 wherein the at least one remote terminal is selected from the group comprising:
a cell phone, a cell phone network, a computing device on a wired network, a computing device on a wireless network, and a radio.

19. The system of claim 15 wherein the position data received by the at least one remote terminal is received one or more data sources selected from the group comprising:
Motion Imagery Standards Board (MISB) Standard 0601.4 UAS Datalink Local Metadata Set, a wired or wireless connection to the GCS, and remote UAS monitoring/control using UAS industry standard messaging formats.

20. The system of claim 15 wherein the ATC-RS provides real-time position updates for the at least one UAS using time-division multiplexing (TDM).

* * * * *